United States Patent [19]

Kazaoka et al.

[11] Patent Number: 4,709,965
[45] Date of Patent: Dec. 1, 1987

[54] SEAT RECLINING APPARATUS

[75] Inventors: Kenichi Kazaoka, Nagoya; Hiroshi Okazaki, Toyota, both of Japan

[73] Assignee: Aisin Seiki Kabushika Kaisha, Japan

[21] Appl. No.: 609,116

[22] Filed: May 11, 1984

[30] Foreign Application Priority Data

Jun. 13, 1983 [JP] Japan ................................ 58-105451

[51] Int. Cl.[4] ................................................ B60N 1/02
[52] U.S. Cl. .................................... 297/366; 297/357; 297/340; 297/367
[58] Field of Search ............... 297/366, 367, 376, 354, 297/355, 363, 364, 357

[56] References Cited

U.S. PATENT DOCUMENTS

| 3,299,466 | 1/1967 | Werner | 297/366 |
| 3,479,088 | 11/1969 | Bonnaud | 297/366 |
| 3,900,225 | 8/1975 | Wirtz et al. | 297/367 |
| 4,295,682 | 10/1981 | Kluting et al. | 297/366 X |
| 4,406,497 | 9/1983 | Kluting | 297/366 |
| 4,502,730 | 3/1985 | Kazaoka et al. | |

FOREIGN PATENT DOCUMENTS

| 2006270 | 9/1971 | Fed. Rep. of Germany | 297/366 |
| 2605522 | 8/1977 | Fed. Rep. of Germany | 297/367 |
| 149986 | 3/1955 | Sweden | 297/366 |
| 1330533 | 9/1973 | United Kingdom | 297/357 |
| 1333756 | 10/1973 | United Kingdom | 297/367 |
| 1422063 | 1/1976 | United Kingdom | 297/366 |
| 2085959 | 5/1982 | United Kingdom | 297/340 |

Primary Examiner—Kenneth J. Dorner
Assistant Examiner—Laurie K. Cranmer
Attorney, Agent, or Firm—Finnegan, Henderson, Farabow, Garrett & Dunner

[57] ABSTRACT

A seat reclining apparatus including a lower bracket for seat cushion, an upper bracket for seat back, a hinge pin connecting the lower and upper brackets allowing the relative rotation, a rack member form on the lower bracket, a pawl member formed on the upper bracket for engagement with the rack member and a locking member operatively connected to the pawl member to control the engagement between the pawl and rack members.

7 Claims, 15 Drawing Figures

SEAT RECLINING APPARATUS

BACKGROUND OF THE INVENTION

1. Field of the Invention

The invention relates to seat reclining apparatus and, more particularly to seat reclining apparatus for vehicles.

2. Description of the Prior Art

A reclining seat for vehicles, as shown in FIGS. 1 and 2, includes a seat cushion 1 and a seat back 2. The seat cushion 1 is fixed to a lower bracket 5 and the seat back 2 is fixed to on an upper bracket 9 rotatably connected to the lower bracket 5. According to the operation of a lever 3, the seat back 2 is pivotable and the reclined position of the seat back 2 is adjustable.

A conventional seat reclining apparatus 4, which folds the seat back 2 or changes the reclined position of the seat back 2, is shown in FIGS. 2 to 4. Three pins 6,7 and 8 are fixed on the lower bracket 5 so that three segmnts among the pins 6,7 and 8 define a triangle. The upper bracket 9 is rotatably mounted on the hinge pin or first pin 6 and a ratchet 10 having a pitch radius (R1) around the first pin 6 is fixed on the lower side of the upper bracket 9. A pawl 11 engageable with the ratchet 10 is rotatably supported around the pin 7. The lever 3 is rotatably mounted on the third pin 8 and is biased in counterclockwise directon as viewed in FIG. 2 by a spring 12. A cam groove 13 is formed in the lever 3 and a cam pin 14 fixed on the pawl 11 is slidably engaged therewith. A cam piece 15 is fixed on the lever 3 so as to abut against the pawl 11 for maintaining the engagement between the ratchet 10 and the pawl 11.

By raising the lever 3 from the engaged position shown in FIG. 2, the lever 3 rotates about the third pin 8 in clockwise direction and the cam piece 15 also moves about the third pin 8 in the same direction. Thus, the position of the cam pin 14 fixed on the pawl 11 is changed in the cam groove 13. Since the cam groove 13 is formed in a bent shape, the pin 14 slightly moves downwardly upon the clockwise rotation of the third pin 8. This result means that the pawl 11 is rotated around the pin 7 and released from the engagement with the ratchet 10.

In the released condition, the upper bracket 9 is rotatable around the hinge pin 6 as shown in FIG. 3. By fully rotatating the upper bracket 9 towards the direction as shown with an arrow (B), the seat back 2 is folded. Also, by releasing the lever 3 after rotating the upper bracket 9 towards one of the directions as shown with arrows (A) and (B), the pawl 11 is again engaged with the ratchet 10 at another position thereof. And as the pawl 11 is abutted by the cam piece 15, the engagement between the pawl 11 and the ratchet 10 is maintained. Namely, the reclined position of the seat back 2 is changed.

In the conventional seat reclining apparatus, as shown in FIG. 3, the upper bracket 9 rotates between the fully reclined position indicated by the solid line and the forward most position indicated by the dashed line. In accordance with the above rotation of the upper bracket 9, the ratchet 10 mounted on the upper bracket 9 is also rotated. The range of the teeth portion of the ratchet 10 corresponds to the rotating range of the upper bracket 9. Thus, a range for housing the ratchet 10 and permitting the rotation of the ratchet 10 will be approximately twice as much as that of the rotation of the upper bracket 9.

While the conventional seat reclining apparatus offers relatively wide range for operation the ratchet 10, the pitch radius (R1) in FIG. 2 of the ratchet 10 should be minimized so as to be housed in the lower bracket 5. This is necessary in case a large load is placed on the upper bracket 9, because the load operating the engagement portion of the ratchet 10 and the pawl 11 grows so large that the teeth of the ratchet 10 and the pawl 11 may be broken.

To avoid the breakage of the teeth of the ratchet 10 and the pawl 11, the size of the teeth of the ratchet 10 and the pawl should be considered. However, the adjustable step, which is determined by the size of the teeth, is also increased and it is impossible to finely adjust the reclining positions of the upper bracket 9. Further, since the pitch radius (R1) of the ratchet 10 is small, by the play of the pawl 11 around the pin 7 or the play of the upper bracket 9 around the pin 6, the upper bracket 9 will also rattle in the large range at the top end thereof. As shown in FIG. 4, the teeth of the pawl 11 is formed so as to prevent the both end teeth (a) and (b) from interfering with the teeth of the ratchet 10. Further, many teeth have to be provided on the pawl 11 so as to give enough strength to the engagement between pawl 11 and ratchet 10. Thus, the pressure angle ($\alpha$) of the pawl 11 will become relatively large.

Accordingly, the large outward force (P1) is given by the force (F) operating the upper bracket 9 through the pressure angle ($\alpha 1$). Since the large outward force (P1) is exerted upon the cam piece 15, the cam piece 15 and the lever 3 respectively have to have enough thickness to accomodate the increase in the mechanical strength of the pawl 11 and the ratchet 10. This will cause the weight and cost of the cam 15 and lever 3 to be increased considerably. Also, since the cam 15 is moved donwardly by receiving such large outward force (P1), the engagement between the pawl 11 and the ratchet 10 may loosen and it becomes impossible to surely maintain the upper bracket 9 at the locking state.

SUMMARY OF THE INVENTION

It is, therefore, a primary object of the invention to provide an improved seat reclining apparatus which obviates the above conventional drawbacks. Another object of the invention is to realize an improved seat reclining apparatus which is simple in construction.

According to the invention, the seat reclining apparatus includes a lower bracket and an upper bracket wherein the upper bracket is rotatably connected to the lower bracket through a hinge pin. A pawl member engageable with a rack is provided on the upper bracket. A locking member is operatively connected to the pawl member with the ratchet. The pawl member is provided on the upper bracket and the rack is provided on the lower bracket. Thus, since the pawl member rotates in accordance with the rotation of the upper bracket around the hinge pin, a space for housing the pawl member may be reduced. Further, since the pawl member is slidable linearly with respect to the rack, a pressure angle of the ratchet is also reduced. Namely, the mechanical strength of the pawl member and the rack becomes increased. In addition, as the size of the teeth of the pawl member and the ratchet grows small, the position of the upper bracket may be adjusted with fine steps. Further as the pitch radius of the pawl member is enlarged, the play of the upper bracket around the hinge pin is reduced.

DETAILED DESCRIPTION OF THE PREFERRED EMBODIMENT

Figure 1:
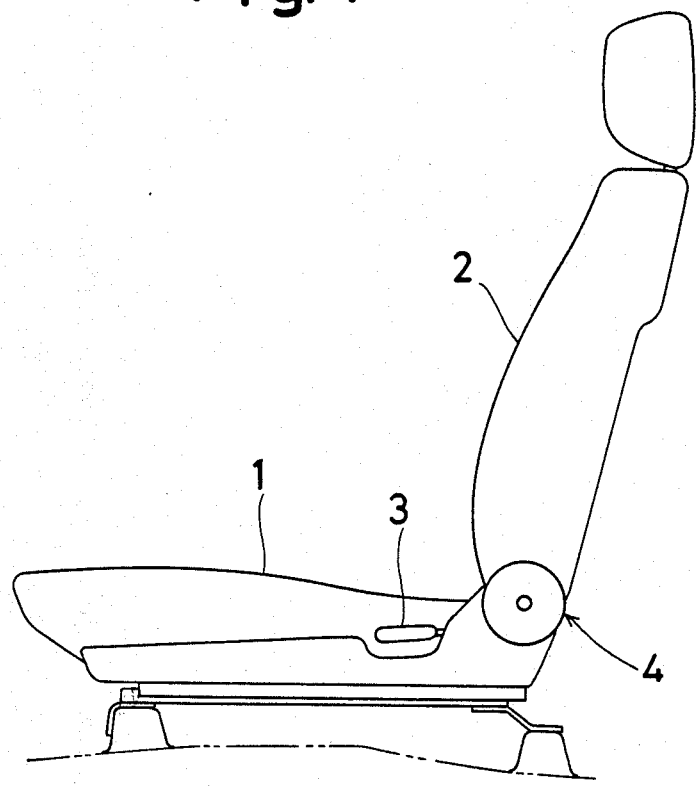
FIG. 1 is a side view of a reclining seat.
Figure 2:
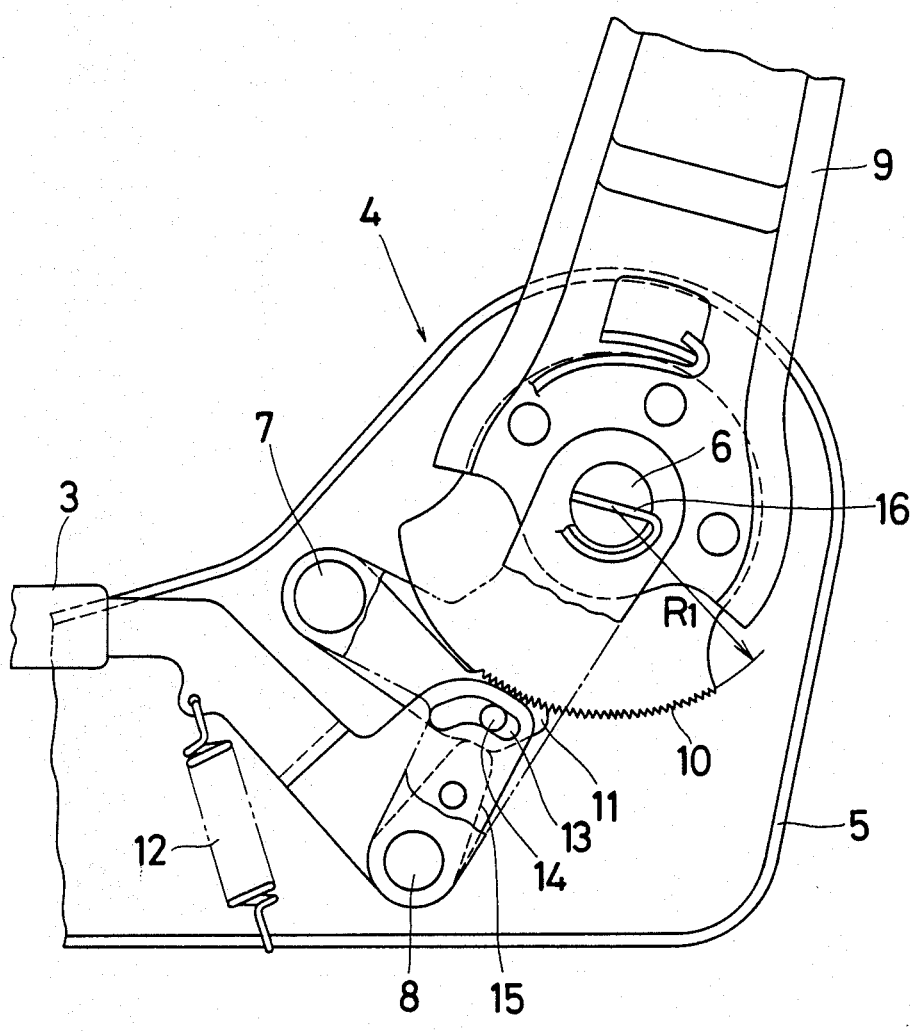
FIG. 2 is a side view of a conventional seat reclining apparatus.
Figure 3:
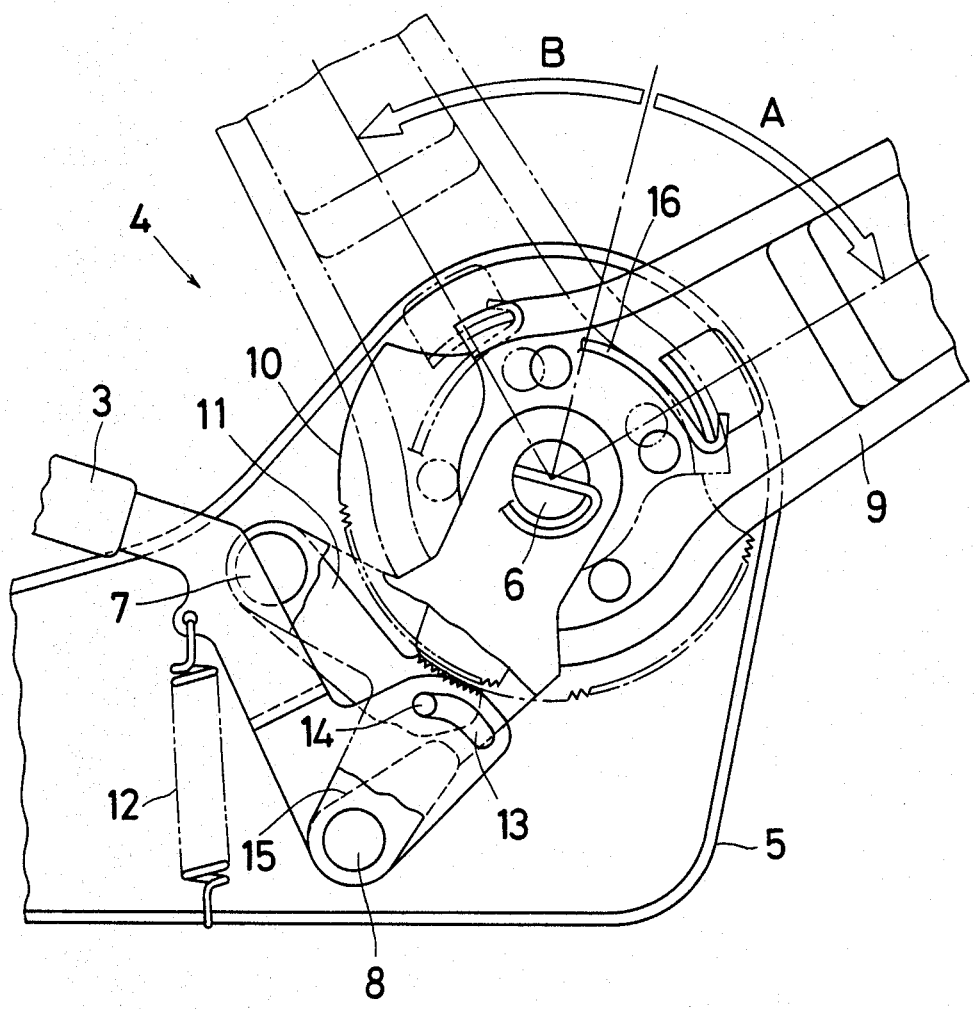
FIG. 3 is a side view of the conventional seat reclining apparatus similar to FIG. 2 but depicting the operation thereof.

Now referring to FIGS. 5 to 9, a seat reclining apparatus includes a lower bracket 20 and an upper bracket 22 and the upper bracket 22 is rotatably mounted on the lower bracket 20 through a hinge pin 21 mounted on the lower bracket 20. A rack 23 is fixedly mounted on the lower bracket 20 and includes a plurality of teeth having a constant distance from the hinge pin 21. The pitch radius (R2) from the hinge pin 21 is larger than that (R1) of prior art apparatus shown in FIG. 2.

A sub-plate 24 is provide along the lower bracket 20. One end of the sub-plate 24 is fixed on the hinge pin 21. A sleeve 26 having an elongated slot 25 therein is fixed on the upper bracket 22 around the hinge pin 21 and the elongated slot 25 is formed in a radial direction of the hinge pin 21. The hinge pin 21 is slidably engaged with the slot 25 of the sleeve 26 and guided by both sides of the slot 25. A spiral spring 27 is provided around the hinge 21. The inner end of the spiral spring 27 is engaged with the hinge pin 21 and the outer end of the spiral spring 27 is engaged with the upper bracket 22 and the spiral spring 27 always biases the upper bracket 22 in a counterclockwise direction about the hinge pin 21 as viewed in FIG. 5.

An operating lever 28 is rotatably mounted on the sleeve 26 and is biased in a counterclockwise direction about the hinge pin 21 by a spring 29. One end of the spring 29 is engaged with the lever 28 and the other end thereof is engaged with the lower bracket 20. A cam pin 30 mounted on the sub-plate 24 is engaged with a circumferentially elongated cam groove 31 formed in the lever 28. Thus, by manual rotation of the lever 28 about the hinge pin 21 in clockwise direction in FIG. 5, the sleeve 26 or the upper bracket 22 slides upwardly in the upright direction with respect to the rack 23.

Figure 7:
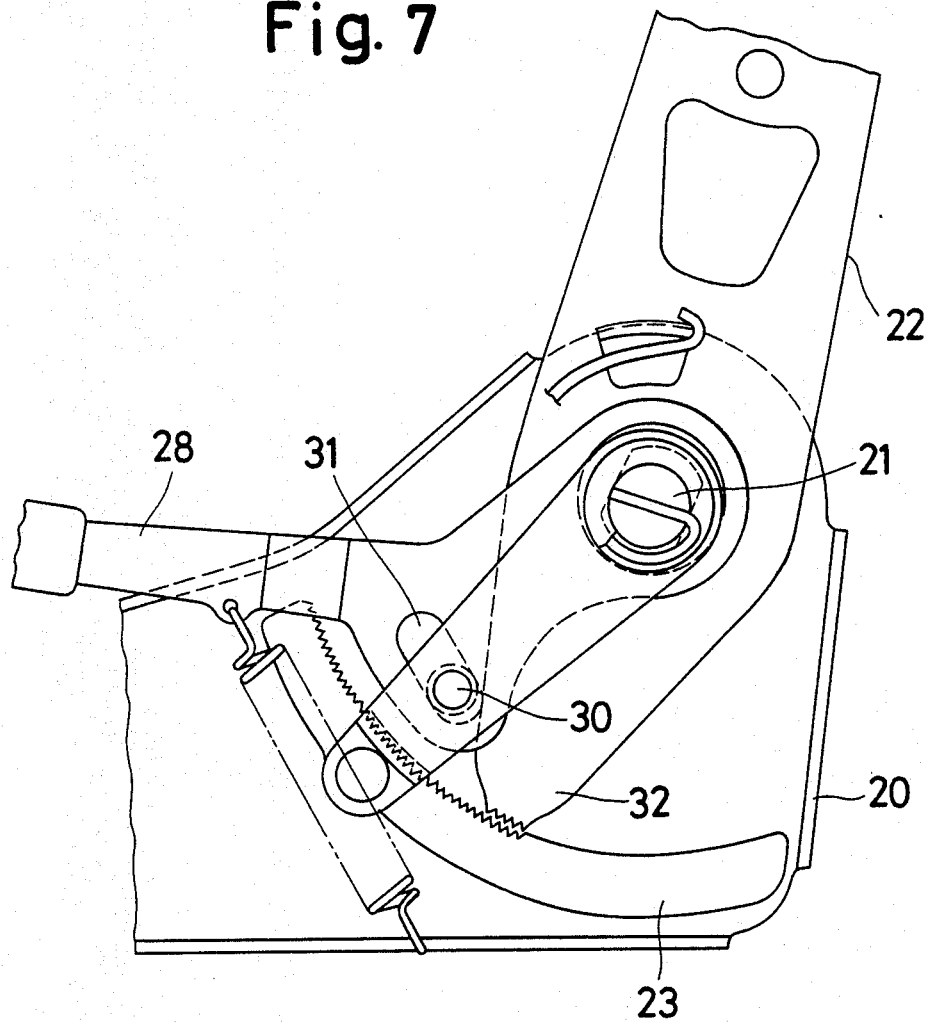
FIGS. 7 and 8 are respectively side views similar to FIG. 5 and showing the operation state of the embodiment.

A pawl member 32 is integrally formed on an extended portion of the upper bracket 22 in a similar direction to the slot 25. The pawl member 32 is releasably engaged with the rack 23 and may be released from engagement with the rack 23 as shown in FIG. 7.

Figure 4:
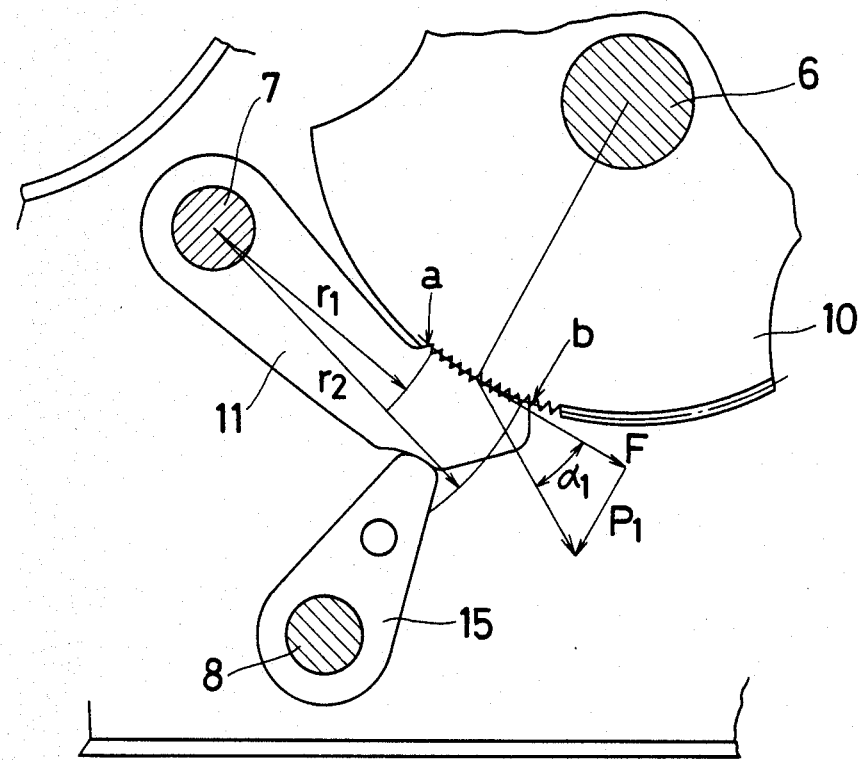
FIG. 4 is a side view of the conventional seat reclining apparatus and showing the pressure angle of the teeth of the ratchet.
Figure 5:
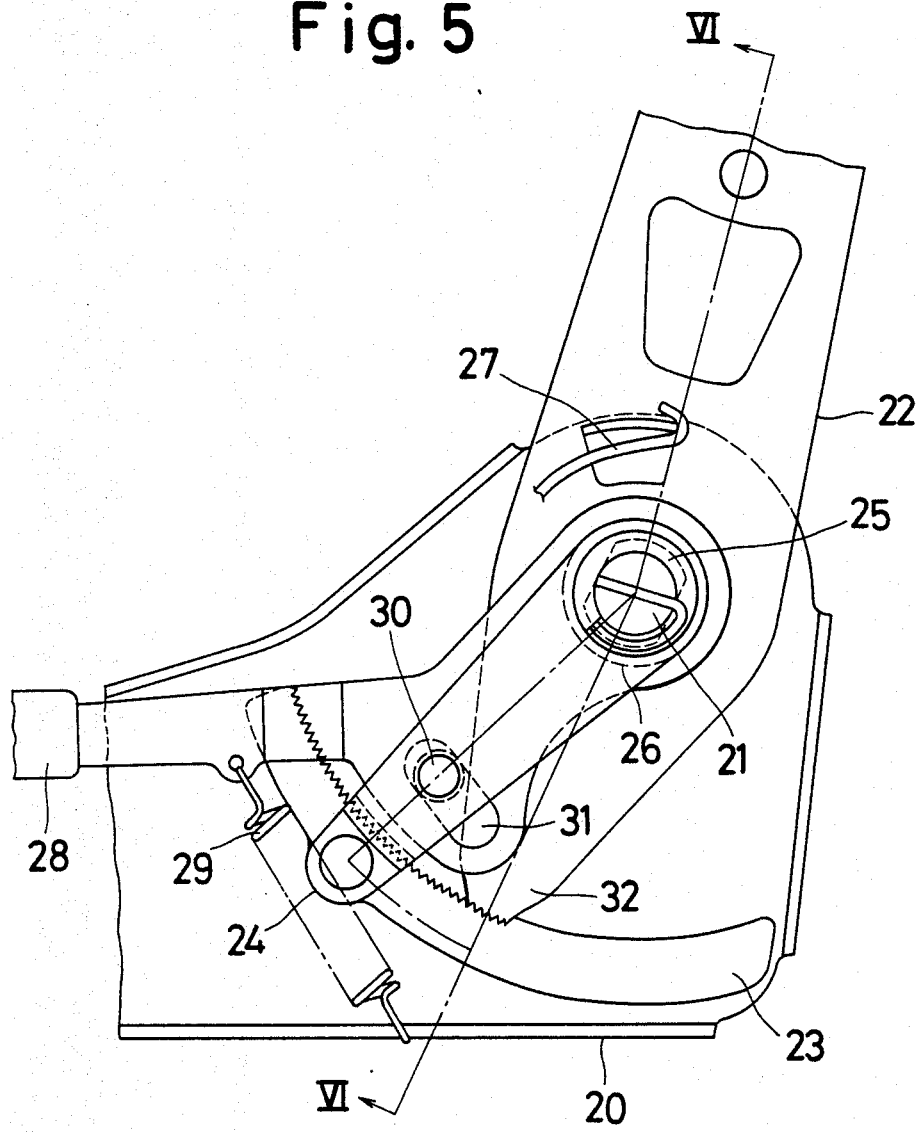
FIG. 5 is a side view according to the present invention.
Figure 8:
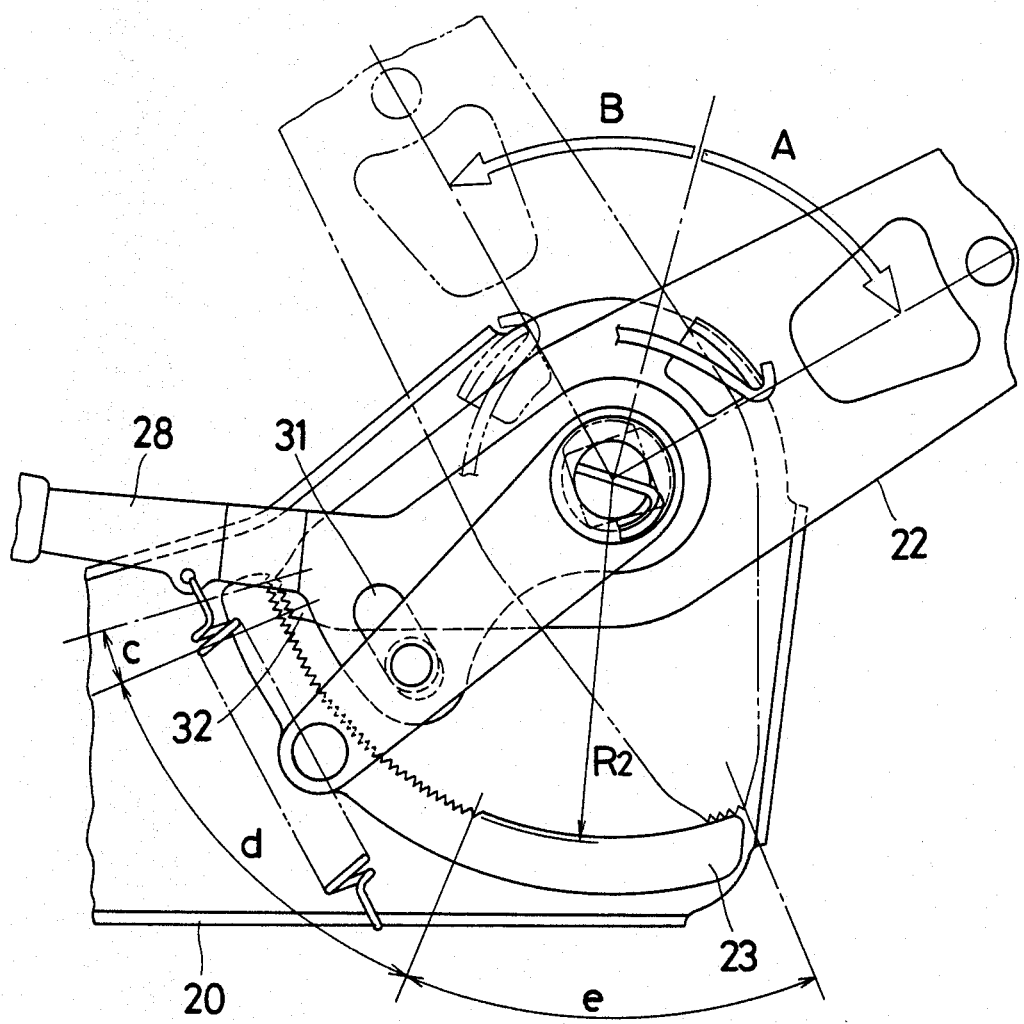
Figure 9:
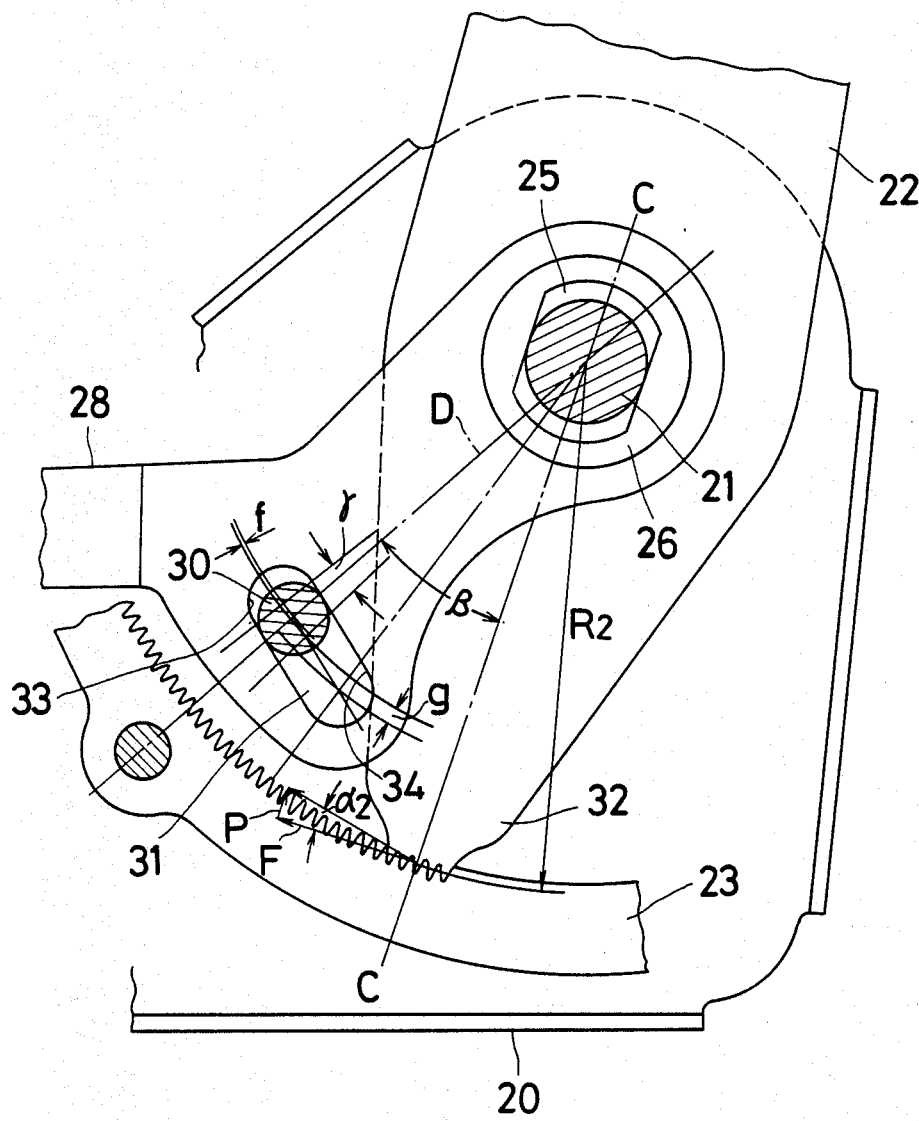
FIG. 9 is a partial enlarged side view showing the pressure angle of the rack.

The rack 23 is provided on the lower bracket 20 and the pawl 32 having a narrow width is integrally formed on the upper bracket 22. Thus, when the reclining position of the seat back, when the upper bracket 22 is adjusted or when the seat back is folded forwardly about the hinge pin 21, the pawl 32 rotates within a range similar to the rotating range of the upper bracket 22 as shown in FIG. 8. Accordingly, the pawl 32 is provided on the upper bracket 22 in a large pitch radius (R2) around the hinge pin 21 as shown in FIG. 9. Further, since the pawl 32 slidably moves in a radial direction about the hinge pin 21, the pressure angle ($\alpha 2$) (in FIG. 9) of the rack 23 may be relatively reduced comparing with that ($\alpha 1$) (in FIG. 4) of conventional ratchet 10.

Therefore, since the pitch radius (R2) of the pawl 32 is relatively large, a load (F) acting upon the upper bracket 22 from the seat back upon vehicle collision or the like is transmitted to the teeth of the pawl 32 and the rack 23 in a reduced condition. Thus, the mechanical strength of the pawl 32 and rack 23 increases accordingly. Since the pawl 32 and the rack 23 have enough mechanical strength, the size of the teeth may be reduced. Thus, the position of the upper bracket 22 is adjustable in small increments to select a preferred reclined position of the seat back.

Further, since the pressure angle ($\alpha 2$) is relatively small, the load (P2) given by the load (F) through the pressure angle ($\alpha 2$) and releasing the engagement of the pawl 32 with the rack 23 is also reduced. Thus, the reliability of the engagement between the pawl 32 and the rack 23 is increased and the thickness of the pawl 32 and the rack 23 may be reduced. Also, since the pitch radius (R2) of the pawl 32 is relatively large, the oscillation of the upper bracket 22 caused by the play between the cam groove 31 of the lever 28 and the cam pin 30 mounted on the sub-plate 24, as well as the play between the slot 25 of the sleeve 26 and the hinge pin 21, is reduced.

As shown in FIG. 9, the cam pin 30 is mounted on the sub-plate 24 at the position far from the line C—C, where the upper bracket 22 or the pawl 32 usually positions very close, by an angle ($\beta$) about the hinge pin 21. The cam groove 31 engaged with the cam pin 30 has a locking surface 33 for sliding the upper bracket 22 downwardly along the slot 25 so as to engage the pawl 32 with the rack 23. The cam groove also includes releasing surface 34 for sliding 34 to the upper bracket 22 upwardly along the slot 25 so as to disengage the pawl 32 from the rack 23. Particularly, the locking surface 33 is deviated by a distance (f) in a radial direction about the hinge pin 21 within an angle range ($\gamma$) where the cam pin 30 positions in the locking state. Since the lever 28 is always biased in the counter-clockwise direction about the hinge pin 21 by the spring 29, the cam pin 30 positions at the leftward position of the locking surface 33 so that the sleeve 26 may move leftwards by the deviation (f) of the locking surface 33, enabling the hinge pin 21 to abut the right side of the slot 25.

Thus, the counter-clockwise rotation of the upper bracket 22 is arrested by the abutment between the slot 25 and the hinge pin 21 and the clockwise rotation of the upper bracket 22 is arrested through the sleeve 26 by the abutment between the locking surface 33 and the cam pin 30. Even though the slot 25 and the cam groove 31 for sliding the pawl 32 are provided, the oscillation of the upper bracket 22 is surely prevented. The releasing cam surface 34 is deviated from the locking surface 33 by a distance (g) in a radial direction about the hinge pin 21 so as to release the pawl 32 from the rack 23.

Figure 10:
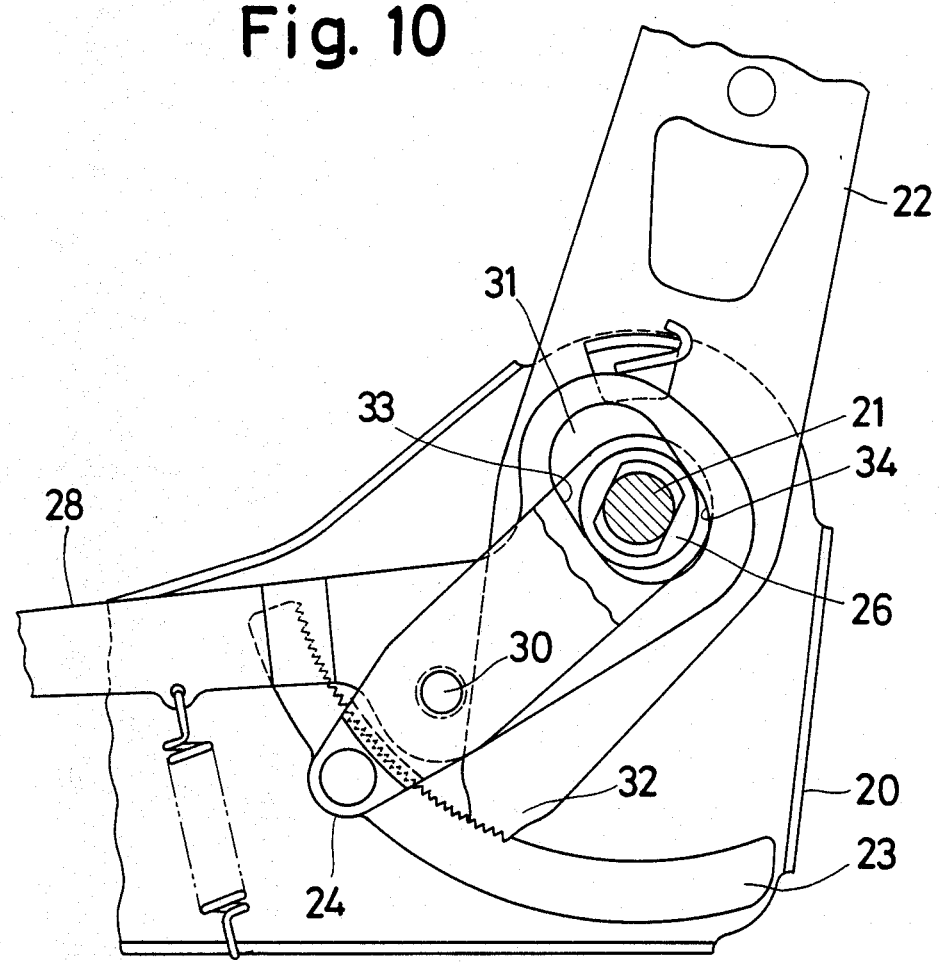
FIG. 10 is a side view of another embodiment according to the invention.

Another embodiment of the invention is shown in FIG. 10. In this embodiment, the lever 28 is rotatably mounted on the lower bracket 20 with the pin 30 and slidably engaged with the sleeve 26 or the cam pin 15 through the slot-shaped cam groove 31 formed thereon. Therefore, by the rotation of the lever 28 about the pin 30, the sleeve 26 slides upwardly and downwardly so that the upper bracket 22 or the pawl 32 may be disengaged from the rack 23 or engaged with the rack 23.

Figure 11:
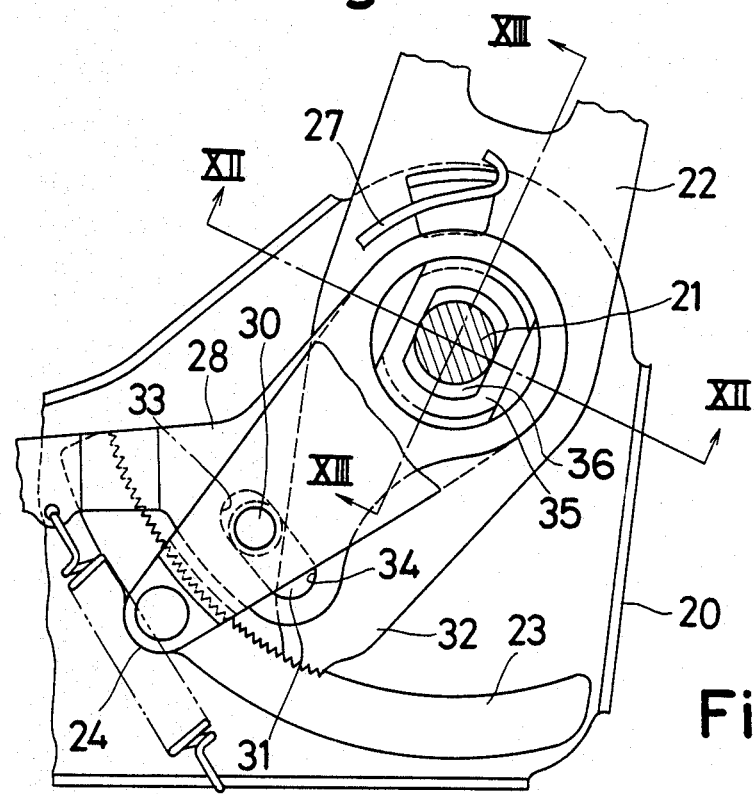
FIG. 11 is a side view of still another embodiment according to the invention.
Figure 12:
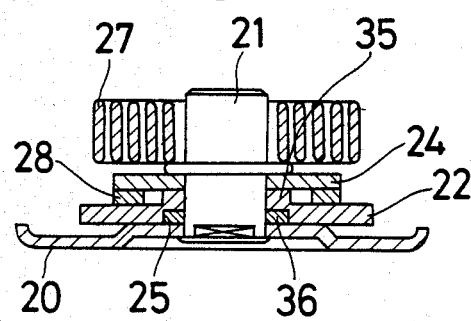
FIG. 12 is a cross-sectional view taken along line XII—XII in FIG. 11.
Figure 13:
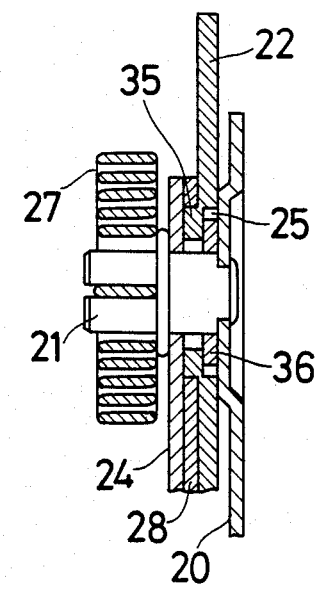
FIG. 13 is a cross-sectional view taken along line XIII—XIII of FIG. 11.
Figure 6:
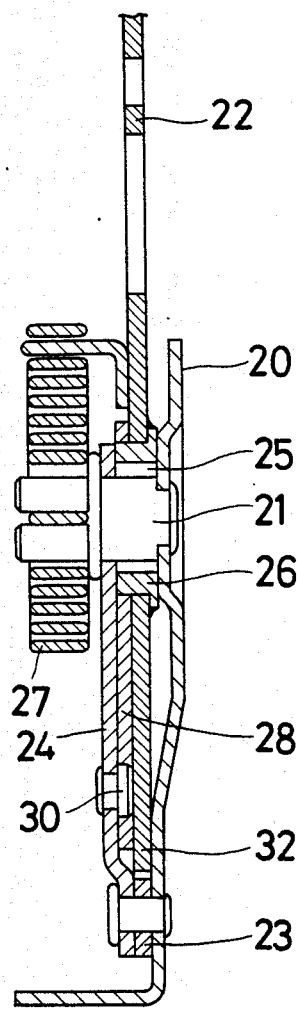
FIG. 6 is a cross-sectional view taken along line VI—VI in FIG. 5.

Still another embodiment according to the invention is shown in FIGS. 11 to 13. In this embodiment, the structure around the hinge pin 21 is changed. The upper bracket 22 has a stepped portion 35 about the hinge pin 21. The stepped portion 35 is located away from the hinge pin 21 towards the pawl 32 and an upper end and a lower end thereof form a circular shape. Further, at the opposite side of the stepped portion 35, a a slot 25 is formed and the slot 25 is also long in a radial direction around the hinge pin 21 towards the pawl 32 and slidably engaged with the guide piece 36 rotatably mounted on a hinge pin 21. Both outer side surface of the guide piece 36 guides both inner side surfaces of the slot 25 respectively in the surface contact condition. Further, the lever 28 is rotatably mounted on the circular ends of the stepped portion 35. A large hole is formed on the stepped portion 35 and the hinge pin 21 is inserted therein. Thus, when the lever 28 is rotated about the hinge pin 21, the upper bracket 22 slides through the cam groove 31 and the cam pin 30. Since the inner side surfaces of the guide piece 36 in the surface contact with the hinge pin 21, the durability of the side surfaces of the slot 25 increases so that upper bracket 22 may be supported without a play or a loose fit on the hinge pin 21.

Figure 15:
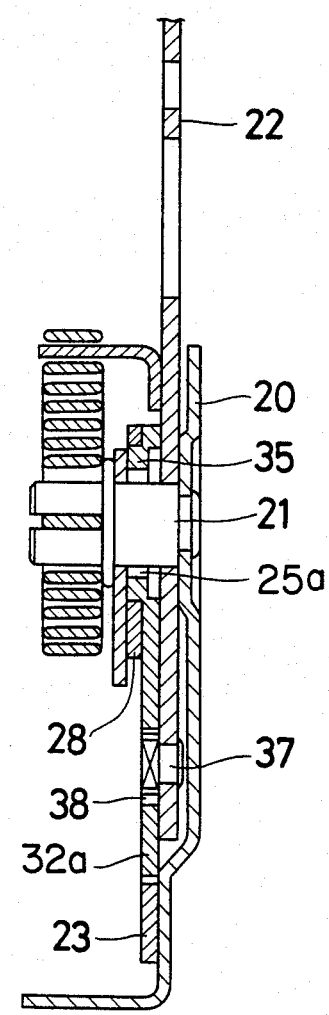
FIG. 15 is a side view taken along line XV—XV in FIG. 14.
Figure 14:
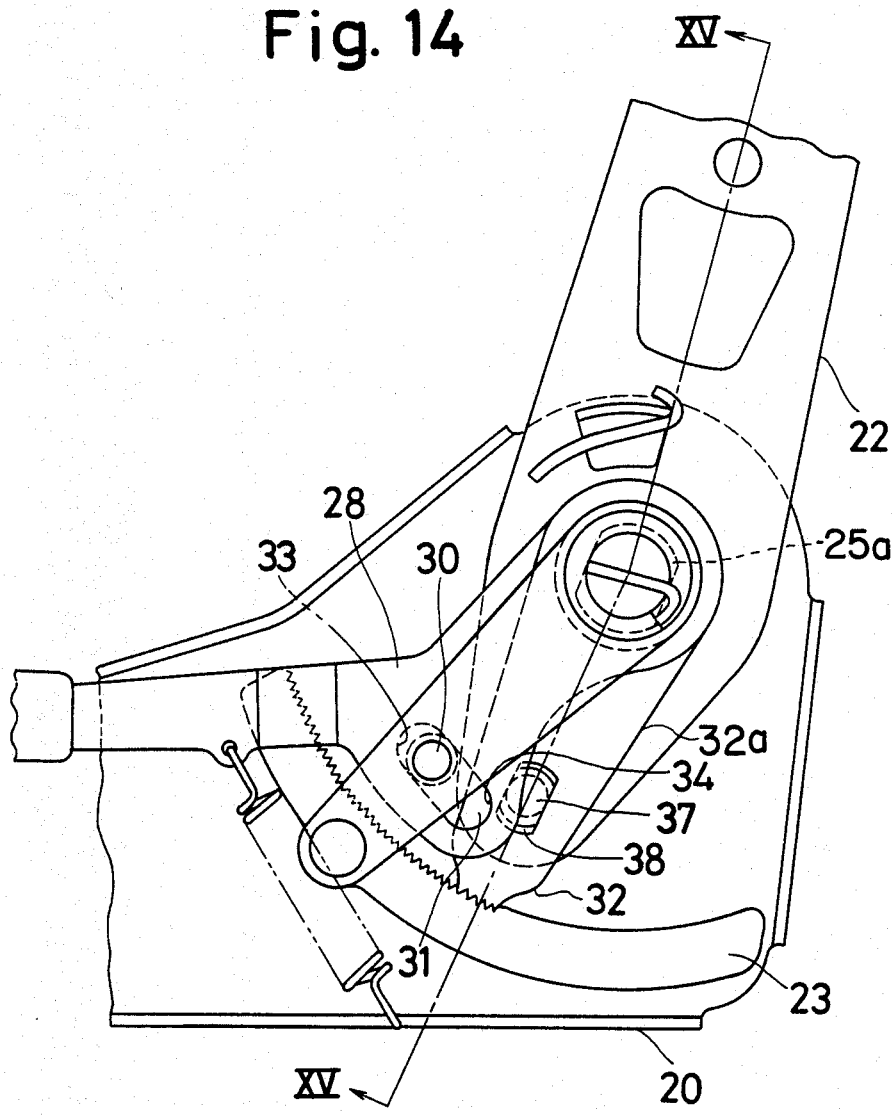
FIG. 14 is a side view of a further embodiment according to the invention.

Further, another embodiment is shown in FIGS. 14 and 15. In this embodiment, the pawl 32 is formed on an intermediate bracket 32a which is separate from the upper bracket 22. The intermediate bracket 32a includes a stepped portion 35 defining a first slot 25A disposed about a hinge pin 21. The intermediate bracket 32a also includes a second sleeve defining a second slot 38 extending in a radial direction around the hinge pin 21 at the lower side thereof. A pin 37 mounted on the upper bracket 22 is inserted in the second slot 38 and guide surfaces engageable with the side surfaces of the second slot 38 are formed on the both sides of the pin 37. The intermediate bracket 32a includes the stepped portion 35 at the upper side thereof having a circular outer surface around the hinge 21. The first and second slots 25a, 38 are formed in the same radial direction about the hinge pin 21 so as to permit the intermediate bracket 32a to move between the engaged position where the pawl 32 is engaged with the rack 23 and the released position where the pawl 32 is disengaged from the rack 23. Thus, when the lever 28, which is rotatably mounted on the circular outer surface of the intermediate bracket 32a is rotated, the pawl 32 moves upwards and downwards.

What is claimed is:

1. An apparatus for adjusting the inclination of a backrest of a vehicle seat having a seat cushion comprising:
    a lower bracket for supporting the seat cushion;
    an upper bracket for supporting the backrest;
    hinge means mounted on said lower bracket for rotatably supporting said upper bracket;
    means mounted on said upper bracket for slidably connecting said upper bracket to said hinge means, wherein said slidably connecting means includes a sleeve member having an elongated slot disposed about said hinge means;
    an operating lever rotatably mounted on said sleeve member and biased in a first direction;
    means extending between said upper bracket and said hinge means for biasing said upper bracket in said first direction;
    first engaging means spaced radially from said hinge means on said lower bracket and extending along a curve, wherein said curve comprises an arc of a circle centered at said hinge means;
    second engaging means projecting from said upper bracket for cooperating with said first engaging means to hold said upper bracket at the desired inclination; and
    means for releasably locking said first engaging means into fixed engagement with said second engaging means, said locking means including a locking plate fixedly attached to said hinge means and having a projection mounted thereon, said locking means also including an elongated groove extending along said operating lever for receiving said projection, wherein rotation of said lever slidably moves said groove along said projection enabling said second engagement means to be selectively positioned in a lock position and in a release position, said first and second engaging means being engaged in said lock position and disengaged in said release position to allow adjustment of the inclination of the backrest.

2. The apparatus as defined in claim 1, wherein said hinge means includes a circular pin positioned within said elongated slot having a pair of parallel linear surfaces and a pair of opposing curved surfaces, enabling said slot to be slidably positioned about said pin.

3. The apparatus as defined in claim 1, wherein said first engaging means is a rack having a plurality of individual first tooth members and wherein said second engaging means is a pawl member having at least one second tooth member for meshing with said first tooth members.

4. The apparatus as defined in claim 3, wherein said elongated groove is substantially linear, wherein said at least one second tooth member is spaced radially inward of said rack in said release position, and wherein said first and second engaging means securely mesh in said lock position to prevent oscillation of the backrest.

5. The apparatus as defined in claim 4, wherein said hinge means includes a guide piece rotatably mounted on said hinge pin and wherein said upper bracket includes a stepped member for rotatably supporting said operating lever, said stepped member slidably engaging said hinge pin and said guide piece.

6. An apparatus for adjusting the inclination of a backrest of a vehicle seat having a seat cushion comprising:
    a lower bracket for supporting the seat cushion;

an upper bracket for supporting the backrest;

hinge means mounted on said lower bracket and rotatably attached to said upper bracket;

an intermediate bracket mounted on said hinge means;

first means extending along said intermediate bracket for slidably connecting said intermediate bracket to said hinge means, wherein said first slidably connecting means includes a stepped portion defining a first slot disposed about said hinge means;

a guide pin mounted on said upper bracket;

second means extending along said intermediate bracket for slidably connecting said intermediate bracket to said guide pin, wherein said second slidably connecting means includes a second slot disposed about said guide pin, said second slot being aligned with said first slot enabling said upper bracket to slide linearly;

an operating lever rotatably mounted on said stepped portion and biased in a first direction;

means extending between said upper bracket and said hinge means for biasing said upper bracket in said first direction;

first engaging means spaced radially from said hinge means on said lower bracket and extending along a curve, wherein said curve comprises an arc of a circle centered at said hinge means;

second engaging means projecting from said intermediate bracket for cooperating with said first engaging means to hold said upper bracket at the desired inclination; and means for releasably locking said first engaging means into fixed engagement with said second engaging means, said locking means including a sub-plate fixedly attached to said hinge means and having a projection mounted thereon, said locking means also including an elongated groove disposed on said operating lever for receiving said projection, wherein rotation of said operating lever slidably moves said groove along said projection enabling said second engaging means to be selectively positioned in a lock position and in a release position, said first and second engaging means being engaged in said lock position and disengaged in said release position to allow adjustment of the inclination of the backrest.

7. An apparatus for adjusting the inclination of a backrest of a vehicle seat having a seat cushion comprising:

a lower bracket for supporting the seat cushion;

an upper bracket for supporting the backrest;

hinge means mounted on said lower bracket and rotatably attached to said upper bracket;

an intermediate bracket mounted on said hinge means;

first means extending along said intermediate bracket for connecting said intermediate bracket to said hinge means, wherein said first connecting means includes a stepped portion defining a first slot disposed about said hinge means;

a guide pin mounted on said upper bracket;

second means for connecting said intermediate bracket to said guide pin;

an operating lever rotatably mounted on said stepped portion and biased in a first direction;

means extending between said upper bracket and said hinge means for biasing said upper bracket in said first direction;

first engaging means spaced radially from said hinge means on said lower bracket and extending along a curve, wherein said curve comprises an arc of a circle centered at said hinge means;

second engaging means projecting from said intermediate bracket for cooperating with said first engaging means to hold said upper bracket at the desired inclination; and means for releasably locking said first engaging means into fixed engagement with said second engaging means, said locking means including a sub-plate fixedly attached to said hinge means and having a projection mounted thereon, said locking means also including an elongated groove disposed on said operating lever for receiving said projection, wherein rotation of said operating lever slidably moves said groove along said projection enabling said second engaging means to be selectively positioned in a lock position and in a release position, said first and second engaging means being engaged in said lock position and disengaged in said release position to allow adjustment of the inclination of the backrest.

* * * * *